Nov. 6, 1951  M. R. ANSTICE, SR  2,573,945
GLASS WASHER
Filed April 28, 1945  5 Sheets-Sheet 1
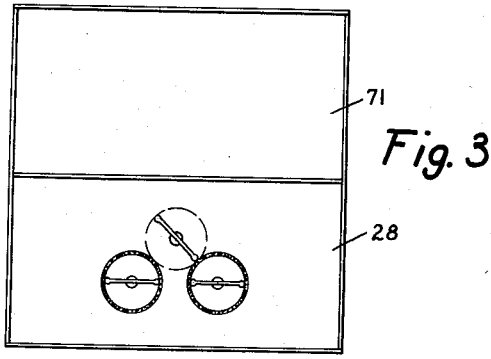
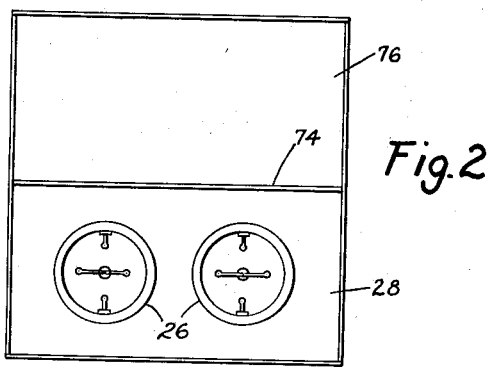
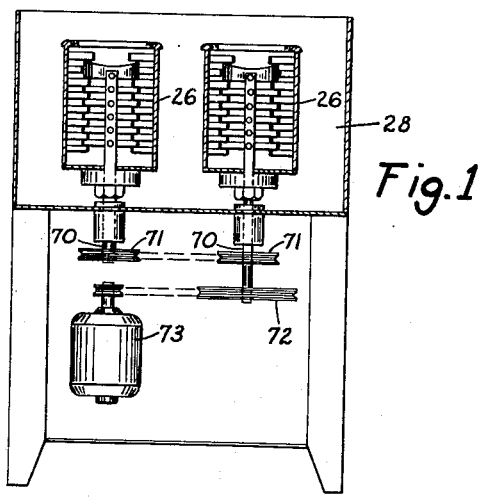
INVENTOR.
MORTIMER R. ANSTICE, SR.
BY
ATTORNEY Nov. 6, 1951
M. R. ANSTICE, SR
2,573,945
GLASS WASHER
Filed April 28, 1945
5 Sheets-Sheet 2
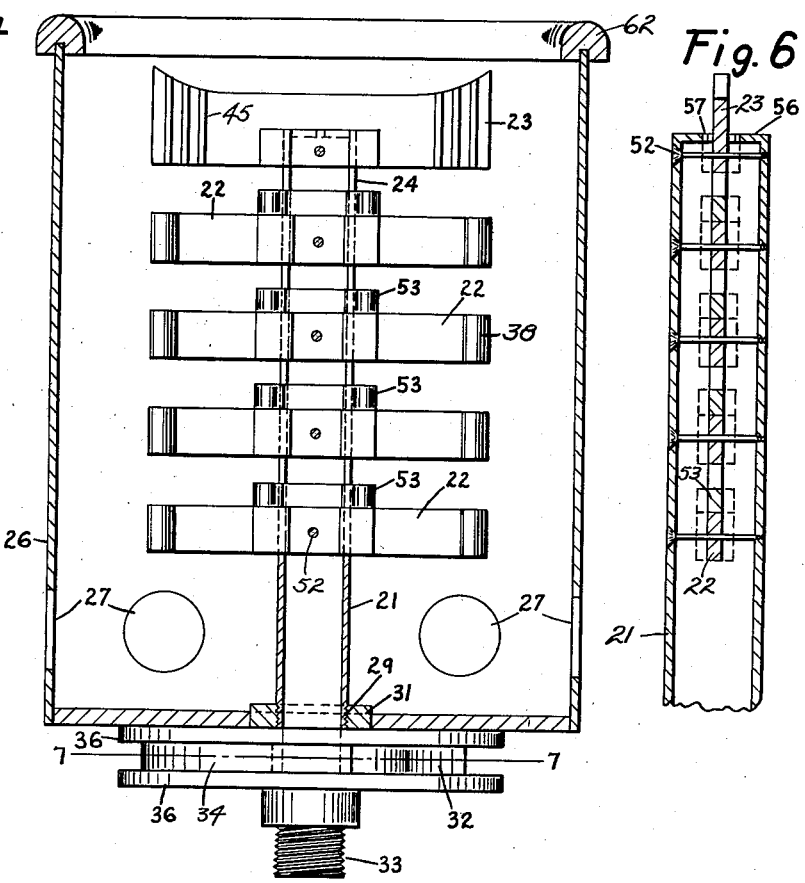
INVENTOR.
MORTIMER R. ANSTICE, SR.
BY
ATTORNEY

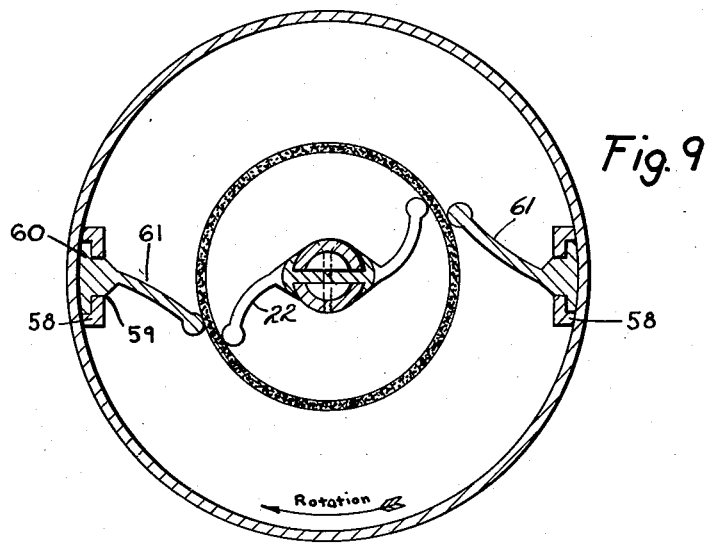
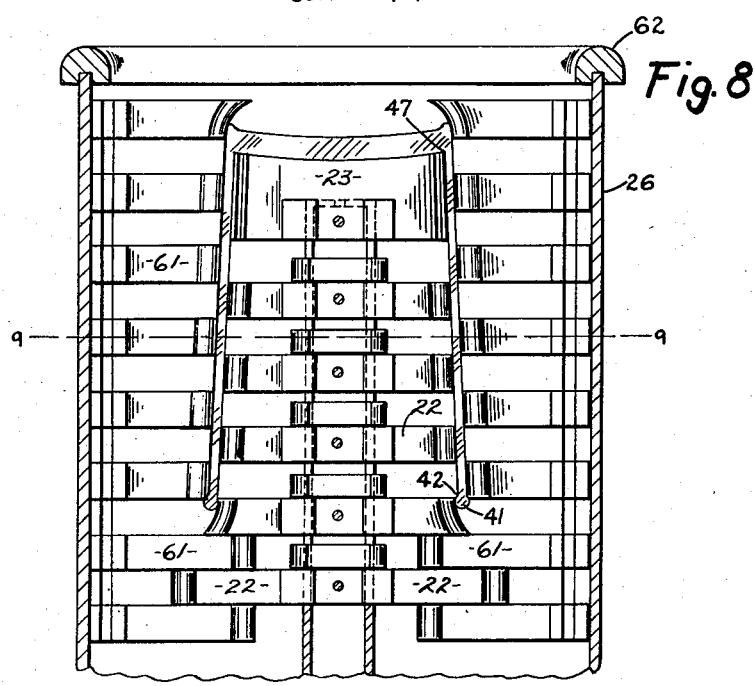

Nov. 6, 1951 M. R. ANSTICE, SR 2,573,945
GLASS WASHER
Filed April 28, 1945 5 Sheets-Sheet 4

INVENTOR.
MORTIMER R. ANSTICE, SR.
BY
ATTORNEY

Nov. 6, 1951  M. R. ANSTICE, SR  2,573,945
GLASS WASHER

Filed April 28, 1945  5 Sheets—Sheet 5

INVENTOR.
MORTIMER R. ANSTICE, SR.
BY
ATTORNEY

Patented Nov. 6, 1951

2,573,945

UNITED STATES PATENT OFFICE 2,573,945

GLASS WASHER

Mortimer R. Anstice, Sr., Rochester, N. Y., assignor, by mesne assignments, to Toledo Scale Company, Toledo, Ohio, a corporation of New Jersey Application April 28, 1945, Serial No. 590,877

2 Claims. (Cl. 15—101)

My invention relates to a glass washer or an assembly suitable for use in washing table glasses, tumblers, flasks, or other open mouth articles made of glass, plastic or other materials.

The commercial glass or tumbler washers of the prior art, and particularly the washing elements thereof, are objectionable and inefficient for a number of reasons. In most commercial glass washers a relatively stiff bristle brush is employed which is mounted on a spindle and rotated with the glass held in telescopic relation therewith, washing fluid being supplied to the inner side walls of the glass. These brushes, due to the inherent character of bristles, do not efficiently scour and cleanse the entire inner surface of the glass and the bristles accumulate and become fouled with food particles and other refuse material. The bristles soon become filthy and unsanitary and are extremely difficult to clean.

A further objection to a brush type glass washer is that it will not accommodate itself to the size or diameter of the glass being washed. A given diameter brush is suitable for proper use only with a small range of glass diameters. Thus, for example, a glass of a diameter larger than the brush with which it is used may be washed and then only inefficiently, by shifting the axis of the glass laterally with respect to the axis of the brush. When a glass of a diameter appreciably smaller than the diameter of the brush is washed it is necessary to force the glass over the bristles of the brush. Th bristles in this operation are bent and distorted so that the bristles lie more or less flatwise against the side walls of the glass. In this condition they do not afford a satisfactory brushing or wiping contact for the reason that the ends of the bristles are the most efficient for scouring and cleaning. Thus, for a given size or diameter of brush only glasses of a limited range of diameters can be effectively scoured and cleaned.

A further objection to present glass washers employing a brush as the cleaning element lies in the fact that the contour of the side and bottom walls of glasses and tumblers vary with different styles and types thereof. In the usual glass washer the bottom engaging end of the brush is provided with a tuft of bristles which is not shaped to fit any particular contour of glass bottom. Instead the attempt is made to force the glass on the brush in such a manner and with such force as to squeeze or spread the bristles of the tufted end and thereby force the bristles to conform to the shape of the bottom of the glass or tumbler. This I have found is not effective for the reason that the bristles lie flatwise against the bottom of the glass and do not extend into the recess formed at the juncture of the bottom wall of the glass with the side walls thereof.

In modern thin walled glasses it is customary to provide a bead at the lip of the glass for the purpose of strengthening the glass against breakage. This bead causes a shallow depression or groove to exist on the inner (and also outer) side wall of the glass just beneath the bead. It is this portion of the glass which the lip of the user contacts and it is, therefore, most essential that this part of the glass be effectively scoured and cleaned. Present brush type glass washers will not effectively clean beneath the lip of the glass unless the brush is of the correct diameter for the glass being washed so that the ends of the bristles will extend into this groove or recess.

A further objection to present brush type glass washers is that an effort is made to wash glasses of varying diameter with the same diameter of brush which not only results in ineffective cleaning of the glass as described above, but also an attempt to force a small diameter glass over a brush of relatively large diameter results in such compression of the bristles and consequent strain on the glass that the glasses, particularly thin wall types, are likely to break, with the resultant possibility of injury to the hand of the operator.

An object of my invention is to provide a simple, inexpensive and efficient element or assembly for washing glasses, tumblers and similar articles.

Another object of my invention is to provide a glass or tumbler washing assembly adapted to replace the conventional brush washers now employed in commercial glass washers for the purpose of rendering such glass washers more efficient in the accomplishment of their intended purpose.

Another object of my invention is to provide an improved and more efficient machine for washing glasses capable of accommodating glasses, tumblers, flasks or other open mouthed articles of a wide variety of sizes, shapes and types and efficiently cleaning and polishing them.

A further object of my invention is to provide a glass or tumbler washing element or assembly which is adapted to conform itself to the shape or contour of the inner side and bottom walls of the glass and reach into any corners or depressions which may exist therein for the purpose of dislodging food particles and thereby efficiently and effectively scouring and cleaning the glass.

My invention further contemplates the provision of a glass washing element or assembly capable of use in commercial glass washers in which a support adapted for rotation carries a multiplicity of flexible arms which have at their ends glass surface engaging portions of rubber or similar material adapted to accommodate themselves to the diameter and shape of the glass being washed, maintain substantially line contact with the glass walls and to exert a squeegee washing and polishing action on the inner side and bottom walls of the glass or tumbler.

Other objects and advantages of my invention will be set forth in the claims and will be apparent from the following description, when taken in connection with the drawings, in which:

Fig. 1 is a vertical sectional view showing the glass washer assembly of my invention, the invention being incorporated in a glass washing machine of the type wherein two glasses or tumblers may be washed simultaneously;

Fig. 2 is a top plan view of Fig. 1;

Fig. 3 is a view similar to Fig. 2 showing the adaptation of my invention to another type of commercial glass washer;

Fig. 4 is a vertical view of the glass washing element or device of my invention shown mounted in the container of a conventional glass washer and illustrating the manner in which the flexible squeegee elements may be mounted and washing fluid supplied to the inner side walls of the glass;

Fig. 5 is a top plan view of Fig. 4 with the container surrounding the washing element omitted;

Fig. 6 is a sectional view showing the rotatable support and illustrating how the flexible squeegee elements may be mounted;

Fig. 7 is a sectional view taken substantially on the line 7—7 of Fig. 4 showing a pump suitable for use with the glass washing element of my invention;

Fig. 8 is a vertical sectional view illustrating the operation of the washing device of my invention with a glass or tumbler held in the washing position.

Fig. 9 is a sectional view taken substantially on the line 9—9 of Fig. 8;

Figure 10:
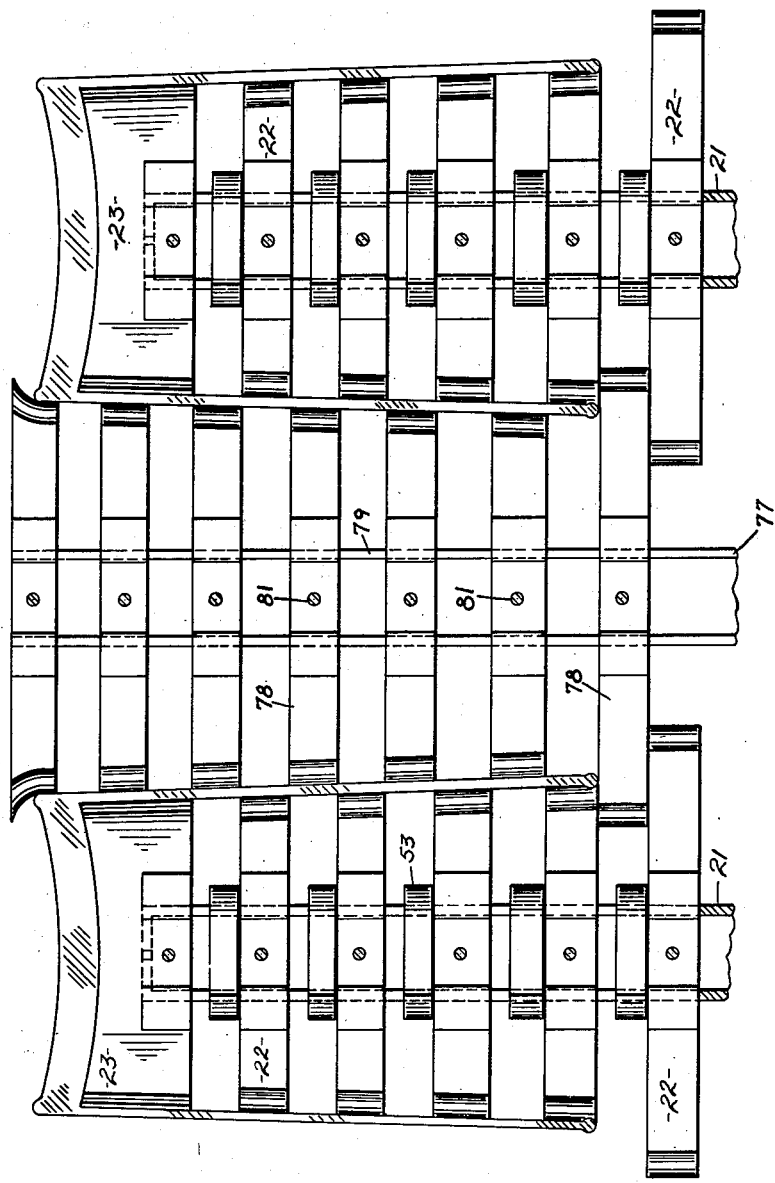
Fig. 10 is a vertical sectional view illustrating the adaptation of the invention to a glass washer of the type shown in Fig. 3.

The glass washer assembly of my invention comprises a tube or support, generally indicated by the numeral 21, which carries a plurality of washing elements 22 and 23, as shown in Fig. 4. The support may be driven rotationally in any suitable manner as indicated in Fig. 1.

The tubular support 21 has a pair of longitudinally extending slots 24 which are arranged diametrically on opposite sides of the tube. The slots extend from the top of the tube to the lowest point thereon at which it is desired to locate a washing element. The tube 21 carrying the washing elements is mounted in a container 26, the purpose of which will later appear. The container has openings 27 in the side walls thereof to enable the free flow of washing fluid into and out of the container from a vat 28, Figs. 1 and 2, which contains the washing fluid.

The tube extends downward through an opening in the bottom of the container 26 and the end thereof is threaded, as indicated at 29, for the reception of a nut 31. A pump, generally indicated by the numeral 32, is rigid with the nut 31 which acts as the driving element of the container which rotates with the support. A pump of any suitable type may be employed, for example, the pump may consist of a pair of vanes 34 as shown in Fig. 7 which lie between shrouds 36. The upper shroud has an opening which registers with the opening in the tubular support. The lower shroud has a threaded extension 33 for the reception of a nut and suitable driving connections.

The pump as viewed in Fig. 7 is rotated in a clockwise direction thereby, due to the shape of the vanes, drawing washing fluid from the vat 28 adjacent the periphery of the pump toward the center of the vanes and forcing such liquid up the tube or hollow support. While I have shown a specific type of pump it will be appreciated that other types might be employed for conveying washing fluid from the vat 28 to a position for effective use in washing the glasses as will be presently described.

Figure 13:
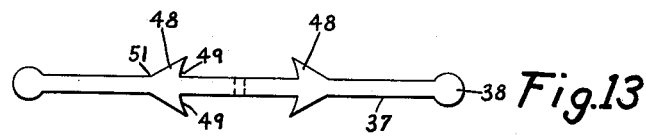
Fig. 13 is a top plan view of one of the squeegee washing elements of my invention.
Figure 14:
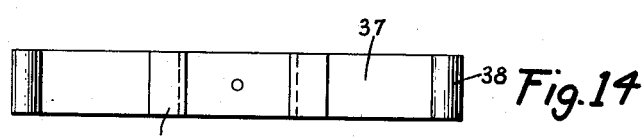
Fig. 14 is a front elevation of Fig. 13.

As shown most clearly in Figs. 13 and 14 each of the washing elements comprises a pair of arms 37 which extend outward from the tubular support. Each of the arms has at the end thereof a bead or enlarged portion 38 which is somewhat cylindrically shaped adapted to contact and press against the inner side wall of the glass, as indicated in Figs. 8 and 9, when the glass washer is in operation.

When a glass of small diameter is to be washed the arms will more or less wrap around the tubular support as confined by the side walls of the glass. No excessive pressures will be exerted on the glass tending to break the same as in the case of present commercial glass washers as previously mentioned. Thus the glass washer is adapted to accommodate itself to a wide range of glass diameters as, for example, large tumblers or small diameter glasses, such as are conventionally employed for serving orange juice.

When the washing elements are rotated centrifugal force tends to throw the arms radially outward with respect to the axis of rotation. For the purpose of increasing the effect of centrifugal force the ends of the arms may be weighted if desired, the weighting of the arms in the instant case being accomplished by the beads 38. Thus, when a glass is in a position to be washed, centrifugal force and the confining of the arms by the side walls of the glass tend to cause the arms to assume the position shown in Fig. 9, in which position the beads are pressed by centrifugal force against the side walls of the glass. Substantially perfect line contact is maintained between the glass surface and the cooperating contacting surfaces of the washing elements regardless of the degree of distortion of the arms since the glass engaging ends are substantially circular in cross section. The flexible rubber material thereof exerts a squeegee action on the inner walls of the glass tending to wash, scour and polish the same. To increase the washing and scouring effect, if desired, the cylindrical ends may be provided with longitudinally extending ridges or projections adapted to engage the glass.

Figure 15:
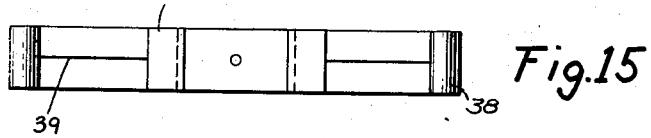
Fig. 15 is a view similar to Fig. 14 showing a slightly modified form of the squeegee washing element.

It will be noted that the strips are relatively narrow and are spaced apart. Moreover, as shown at 39 (Fig. 15), the arms might be slit lengthwise to increase the flexibility of the arms or strips. A further advantage of slitting the strips lies in the fact that some styles of glasses have irregularly shaped walls, such as bulges, annular rings or walls inclined at a steep angle. The washing element shown in Fig. 14 will follow these irregular contours and provide excellent contact between the squeegee washing surfaces and the glass. However, the ability of the washing elements to accommodate themselves to the contour of the side walls and shape themselves as the glass is moved into and out of washing relation is increased by slitting the washing elements as indicated at 39.

One of the important advantages of the glass washer of my invention is illustrated in Fig. 8. As shown in the drawings this is a modern type of glass having a bead 41 for the purpose of minimizing breakage of the glass. It will be found upon examining glasses thus made that a slight depression or concave ring exists at 42. Conventional brush type glass washers do not effectively clean this annular concavity because under most conditions the bristles lie flatwise against the glass surface.

With my glass washer, on the other hand, as the glass is moved into and out of telescopic relation each of the washing elements successively is forced into this concavity to clean and scour the same due to the action of centrifugal force and the deformability of the squeegee washing surfaces. That is, the ends of the washing elements normally rotate in a circle of greater diameter than the minimum diameter glass with which the device is to be used. As the glass is pressed down over the washing elements the contacting surfaces of the elements will be deformed in such a way, due to their flexibility, that they will reach into this concavity and scrub the inside lip of the glass. The annular concavity will be thoroughly scrubbed and cleaned to remove lipstick and other germ holding carriers, such as milk.

Figure 16:
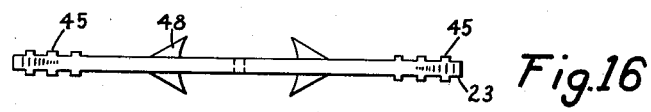
Fig. 16 is a top plan view of the squeegee element preferably employed at the top of the washing device for the purpose of cleaning the bottom wall of the glass.
Figure 17:
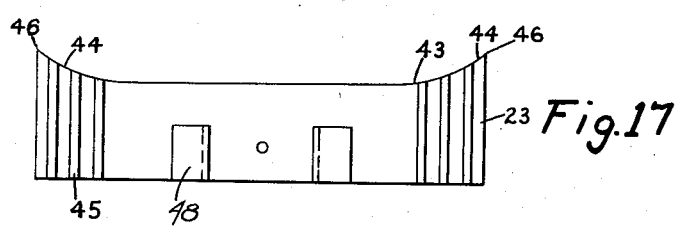
Fig. 17 is a front elevation of Fig. 16.

The uppermost washing element 23 is configured somewhat differently than the washing elements 22, as will appear more clearly from an examination of Figs. 16 and 17. As shown in these views the upper surface 43 is generally concave in shape, the ends thereof as shown at 44 curving upwardly and terminating in points 46. These pointed portions are adapted to reach into the annular recess 47 formed between the bottom and side walls of the glass as shown in Fig. 8. This recess is almost impossible to adequately clean with present commercial glass washers for the reason that the tuft of bristles at the end of the brush will not reach into these corners. The tuft of bristles is merely flattened against the bottom wall and the bent bristles do not reach into the corners.

When a glass is to be washed which has a differently shaped bottom wall than that shown in Fig. 8, as for example, a flat or concave bottom wall, the concave surface 43 of the washing element 23 will be deformed to accommodate such wall. For example, if a glass with a concave instead of the normal convex bottom wall is encountered, the pointed ends and adjacent parts of the washing element 23 will be folded over or deformed to an extent such that the central portion of the washing element will reach into the concavity and effectively clean the bottom wall. The washing element 23 is substantially universal in its application. Due to the flexibility of the material it may be deformed to accurately fit the contour of the bottom wall of almost any glass likely to be encountered. The washing element 23 may be provided with a series of parallel ribs 45 one of which on each side of the element, depending upon the diameter of the glass being washed, will contact the glass side wall and exert a squeegee action thereon. The cylindrical ends 38 of the washing elements 22 are preferably not used in connection with the washing element 23 as this would be likely to make the washing element 23 too stiff so that it would not fold over as described above.

As shown in Figs. 4, 5 and 6 the washing elements extend through the slots in the tubular support and are provided with ears 48 which have surfaces 49 extending around the outer wall of the tubular support. The ears determine the positioning of the washing elements so that they will be centralized with respect to the support. The washing elements should be accurately centralized to minimize vibration. This arrangement also results in the washing elements being stiffened adjacent the slots in the tubular support whereby flexing of the washing elements will not occur at the margins of the slots. This prevents or minimizes wear and cutting of the washing elements by the margins of the slots in the tubular support during flexure of the washing elements. Moreover, this arrangement tends to cause the arms to bend more nearly circularly as shown in Fig. 9 instead of at a sharp angle. The arms tend to bend gradually from the slots outward with the material of the inside bend being in compression and that of the outside of the arms being in tension. Flexure of the arms along substantially their entire length greatly increases the life of the material.

The washing elements are retained in position by screws 52 which are threaded into the tubular support at right angles to the plane of the slots, the washing elements and the tubular support being provided with apertures for the reception of the holding screws. It will be particularly noted that the margins of the slots of the tubular support do not clamp or squeeze the rubber washing elements and the screws merely function to hold the washing elements in the desired position along the tubular support.

Figure 11:
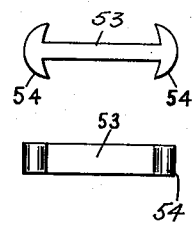
Fig. 11 is a plan view of one of the spacers used in connection with the washing device of my invention.
Figure 12:
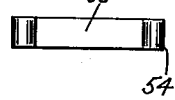
Fig. 12 is a front elevation of Fig. 11.

With the washing elements mounted on the tubular support a space is provided between adjacent washing elements along the tubular support. Washing fluid is free to be discharged by the pump through the tubular support and through the portions of the slots in the tubular support between adjacent washing elements. For the purpose of regulating the flow of washing fluid this intervening space may be partially closed by spacers 53 mounted on the tubular support between adjacent washing elements. The spacers are more clearly shown in Figs. 11 and 12 and may be provided with ears 54 similar to the ears 48. If desired the spacers may be of different or varying widths so that, for example, a greater amount of washing fluid may be discharged adjacent the top of the washing elements than near the bottom. On the other hand, it may be found desirable to discharge a greater amount of liquid near the bottom of the washing elements than near the top and this may be arranged for by varying the widths of the spacers.

The top of the tubular support is provided with a slotted cap 56 which has one or more openings 57 for the discharge of washing fluid against the bottom wall of the glass. Since the washing fluid is under pressure the liquid discharged through the openings 57 impinges upon the bottom wall of the glass and spreads over the surface so as to be effective, in cooperation with the washing element 23, in washing the bottom of the glass.

In the drawings I have shown the washing elements 22 and 23 as being separate members each mounted independently on the tubular support. This enables some latitude in positioning the washing elements so as to properly space the members in accordance with the glasses to be washed. However, if desired the washing elements may be formed integral of a single strip of extruded natural or synthetic rubber with the spaces between adjacent washing elements cut out to provide the desired flexibility of the assembly.

In the drawings I have illustrated a pump for supplying washing liquid to the tubular support and then spraying such liquid sidewardly by centrifugal force against the inner side walls and upwardly against the bottom walls of the glass. For adequately cleaning the glass a spray of washing liquid on the side and bottom walls of the glass appears to be preferable with the glass washer of my invention. The washing fluid, in addition to the washing action caused by the force of the spray, runs down the side walls of the glass and flushes away the food particles loosened by the washing elements. Moreover, the washing fluid flushes the washing elements and keeps them clean.

In Figs. 8 and 9 I have shown the container 26 provided with a pair of brackets or hollow supports 58 on diametrically opposite inner side walls of the container. The brackets are provided with elongated slots 59 and are adapted to retain washing elements 61. (These are omitted from Figure 4 to avoid confusion since these elements, in the absence of an article being washed, are in an overlapping and interfering relation with the washing elements 22.) The washing elements 61 extend through the slots and are preferably of rubber, natural or synthetic. In the preferred form the washing elements 61 are formed integral with a strip 60 of rubber, the strip and washing elements being extruded and the washing elements being cut out after extrusion. The strips 60 are inserted in the brackets at the upper ends thereof.

The extended ends of the washing elements 61 are provided with enlarged ends preferably cylindrical in shape which are adapted with line contact to exert a squeegee action on the outer side walls of the glass in the same manner as the washing elements on the inner side walls of the glass. As the glass is moved into and out of cooperative relation with the washing elements the entire outer side wall, including any depressions or irregularities in the surface, are scrubbed and washed. It will be noted from Fig. 1 that the washing elements for the outer walls of the glass overlap the washing elements for the inner walls of the glass when no glass is in the washing position. If desired bristle brushes instead of the washing elements shown may be used for cleaning the outer side walls.

If the washing elements shown are used they should be, while flexible, sufficiently stiff to retain the ends against the side walls of the glass against the action of centrifugal force resulting from rotation of the container 26. It will be particularly noted that as in the case of inner washing elements the outer washing elements will accurately follow the contour of the glass and reach into any depressions which may exist in the surface. It will further be noted since the washing elements for the inside wall of the glass overlap the washing elements for the outside wall of the glass, that the lip or edge of the glass even when beaded is thoroughly cleaned even to the extent of lipstick which may lie in the shallow depressions formed by the bead.

The upper annular edge of the rotatable container is provided with a lip guard 62 of rubber or other suitable material to protect the hands of the operator should the hands come into contact with the rapidly rotating container.

In Fig. 1 I have shown a pair of containers 26 mounted in the vat 28 containing the washing fluid. Each of the containers has mounted therein a glass washing assembly similar to that described above so that two glasses may be washed simultaneously. A pair of driven shafts 70 extend through the bottom of the vat and through suitable shaft supports, each extended and carrying a pulley adapted for the reception of a driving belt. A second pulley 72 is mounted on one of the shafts and is belt driven from a prime mover or motor 73. Thus the containers 26 and the washing elements of both glass washing assemblies are driven from a common motor.

As is conventional practice, the vat 28 is divided by a partition 74 to provide a compartment 76 for the reception of fluid for rinsing the glasses. In Fig. 3 I have shown a modified two glass washer in which the washing elements for washing the inside of the glasses may be the same as described above. The outer walls of the two glasses are washed by a common set of washing elements as more clearly shown in Fig. 10.

In this arrangement a tubular support 77 is adapted to receive washing elements 78 which are mounted in slots 79 on the tubular support and held in position by screws 81. The tubular support 77 is rotated from the same source of power as the tubular supports which carry the washing elements for the inner side walls of the glass. In this type of washer the glasses are released from hand control or allowed to slip in the hands after they are in position so that the glasses rotate with respect to the washing elements for washing the outer walls of the glass.

While I have shown the preferred form of my invention, it will be appreciated that various changes and modifications may be made therein, particularly in the form and relation of parts, without departing from the spirit of my invention as set forth in the appended claims.

I claim:

1. In a glass washing machine, a glass washing device comprising, in combination, an axially elongated rotatable spindle and a plurality of axially spaced thin, flexible, radially extending arms, removably mounted on said spindle, each of said arms having a thin flat body of greater thickness axially than tangentially and being adapted independently to flex throughout its length toward said spindle without substantial displacement in an axial direction, each of said arms terminating in a generally cylindrical, axially extending bead of diameter substantially greater than the thickness of said arm and formed integrally with said arm, whereby upon rotation of said spindle and said arms relative to a glass placed telescopingly therearound, said arms flex inwardly toward said spindle contra to the direction of rotation thereof with each of said beads independently engaging the inner surface of the glass in wiping relation thereto.

2. In a glass washing machine, in combination, an axially elongated rotatable spindle; a cylindrical chamber coaxial and rotatable therewith, said chamber having an open end through which a glass is insertable into telescoping relation with said spindle and with said chamber; a set of outwardly directed, axially spaced, thin, flexible arms removably mounted on said spindle and extending radially toward the walls of said chamber; and a set of similar arms removably mounted on the inner walls of said cylindrical chamber and extending inwardly toward said rotary spindle, the lengths of the first mentioned and the second mentioned arms being such that their ends are interdigitated with the ends of the arms on said spindle extending between the ends of the arms mounted on the walls of said chamber; the arms in each of said sets of arms having bodies in the shapes of thin ribbons and such bodies extending axially substantially equal to the distance between adjacent arms in the other set of arms; each of said arms in both sets terminating in a generally cylindrical, axially extending bead having a diameter greater than the thickness of said arm and being formed integrally with said arm; whereby upon rotation of said spindle and chamber relative to a glass placed in telescoping relationship over said spindle and within said chamber, all of said arms are flexed throughout their lengths with the arms on said spindle being flexed inwardly and the arms on said chamber being flexed outwardly to accommodate the glass with all of the beads on all of the arms engaged in wiping relation on the surfaces of said glass.

MORTIMER R. ANSTICE, Sr.

REFERENCES CITED

The following references are of record in the file of this patent:

UNITED STATES PATENTS

| Number | Name | Date |
| --- | --- | --- |
| 835,925 | Will | Nov. 13, 1906 |
| 1,200,602 | Freud | Oct. 10, 1916 |
| 1,274,909 | Linderme | Aug. 6, 1918 |
| 1,320,513 | Volckening | Nov. 4, 1919 |
| 1,436,361 | Seeley | Nov. 21, 1922 |
| 2,011,207 | Vermeiren | Aug. 13, 1935 |
| 2,029,855 | Chambers | Feb. 4, 1936 |
| 2,148,486 | Markwood | Feb. 28, 1939 |